United States Patent
Eger

[15] 3,635,518
[45] Jan. 18, 1972

[54] MOUNTING OF A ROOF ATTACHMENT IN THE FRONT OR REAR SPACE

[72] Inventor: Georg Eger, Pleidelsheim, Germany

[73] Assignee: Dr.-Ing. h.c.F. Porsche K.G., Stuttgart-Zuffenhausen, Germany

[22] Filed: Nov. 10, 1969

[21] Appl. No.: 875,111

[30] Foreign Application Priority Data

Nov. 22, 1968 Germany..................P 18 10 253.9

[52] U.S. Cl.......................296/76, 224/42.45 R, 296/137 R
[51] Int. Cl. .........................................................B60j 7/10
[58] Field of Search ..........................296/76, 116, 117, 137; 224/42.42, 42.45 R, 29; 214/454, 450, 451

[56] References Cited

UNITED STATES PATENTS

| | | | |
|---|---|---|---|
| 2,091,071 | 8/1937 | Girl........................................ | 214/454 |
| 2,320,856 | 6/1943 | Ehlers.................................... | 214/454 |
| 2,660,349 | 11/1953 | Bernau.................................. | 224/42.42 |
| 2,768,025 | 10/1956 | Spear et al............................. | 296/117 |
| 2,860,004 | 11/1958 | Hollowell et al...................... | 296/117 |
| 3,271,067 | 9/1966 | Rollman................................ | 296/116 |

OTHER PUBLICATIONS

Sprite Austin Healy Sprite MKIII Advertising Pamphlet, Publication No. U.S.A./1995/F, February 4, 1965

Primary Examiner—Leo Friaglia
Assistant Examiner—Leslie J. Paperner
Attorney—Craig, Antonelli & Hill

[57] ABSTRACT

A passenger car with a detachable roof attachment which can be stored in the passenger car's front or rear space closeable by a hood. The roof attachment is mounted by devices arranged on oppositely disposed transverse fixed walls of the passenger car superstructure; the transverse walls define the front or rear space of the passenger car. The devices are provided with bearing sections for surrounding the rims of the roof attachment in a tonglike or clamplike manner. At least one of the devices is provided with an elastic section which makes possible the opening of the bearing section and a widened portion with a cam which rests against an inner portion of the hood to prevent undesired release of the roof attachment from the devices.

14 Claims, 3 Drawing Figures

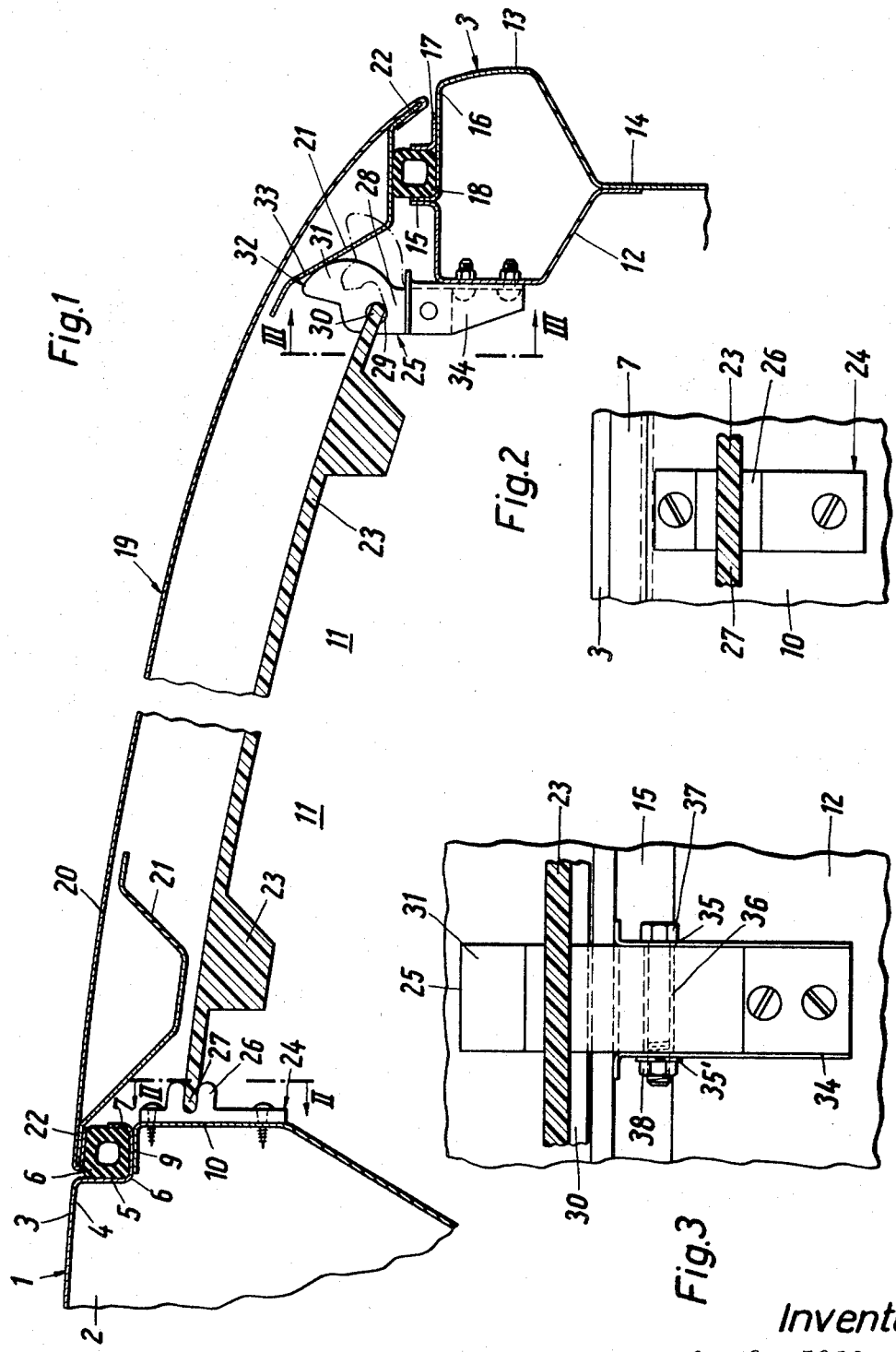

MOUNTING OF A ROOF ATTACHMENT IN THE FRONT OR REAR SPACE

BACKGROUND OF THE INVENTION

The present invention relates to a passenger car with a detachable roof attachment, and more particularly to a roof attachment which can be accommodated and stored in the passenger car's front or rear space which can be closed by a hood.

The accommodation of a roof attachment in the front or rear space of a vehicle requires measures which ensure a secure and rattleproof mounting of the detachable attachment. In conventional vehicles having detachable roof attachments, the roof attachments are stored in the front space without any special fastening provisions. This arrangement is disadvantageous insofar as troublesome rattling noises can be produced by the loose roof attachments during driving of the vehicle. Besides, there is the danger that the surface of the detachable components will be damaged at portions of the superstructure contacted by the components.

SUMMARY OF THE INVENTION

It is the aim of the present invention to overcome the problem of providing a satisfactory and secure mounting in the front or rear space for roof attachments in connection with vehicles of the aforementioned type. However, at the same time, the removal and anchoring of the attachment should also be possible, in each instance, in a rapid and simple manner.

The underlying problems are solved ion accordance with the present invention by mounting and retaining the roof attachment in the front or rear space by means of devices arranged on walls of the passenger automobile superstructure.

It is also advantageous to dispose the devices for mounting the roof attachment on opposed transverse superstructure walls which define the front or rear space of the passenger car. For this purpose, the devices comprise bearing sections surrounding rims of the roof attachment in the manner of tongs or clamps.

It is also advantageous to provide at least one of the oppositely disposed devices for holding the roof attachment with an elastic portion which makes possible the opening of the bearing section. The device with the elastic portion has an extension or widened section provided with a cam which rests at an inner plate of the hood. Advantageously, the device with the elastic portion is provided on the transverse wall adjacent an end wall of the passenger car.

The advantages of the present invention reside in the fact that the devices for retaining the roof attachment make it possible to hold the roof attachment in the front or rear space of the passenger car in a satisfactory secure, and rattleproof manner. Besides, the devices are arranged and constructed in a space-saving and functionally correct manner, so that the mounting of the roof attachment can be effected rapidly and simply.

BRIEF DESCRIPTION OF THE DRAWING

These and further aims, advantages and objects will become more apparent from the following description when taken in connection with the accompanying drawings, which show, for purposes of illustration only, one embodiment in accordance with the present invention, and wherein:

FIG. 1 is a central longitudinal sectional view through the rear zone of a passenger car;

FIG. 2 is a section along line II—II of FIG. 1 and

FIG. 3 is a section along line III—III of FIG. 1.

DETAILED DESCRIPTION OF THE DRAWINGS

Referring now to the drawings and, in particular, to FIG. 1, only rear part 2 of the passenger car 1 is illustrated. The rear part comprises a fixed superstructure 3 provided with an external formed or pressed part 4 which is provided with bent portions 5, 6, 7 at its free ends. These bend portions form a channel member wherein a sealing element 8 is provided. The external formed part 4 with the bend 6 rests on an angled portion 9 of a partition or transverse wall 10 which connects the sidewalls (not shown) of the passenger car 1 with each other.

The partition 10 is fixedly connected with the external formed part 4 by conventional connecting means such as for example, welding or the like, and the partition 10 constitutes the front boundary of a rear space 11. The rear boundary of the rear space 11 is represented by a partition or wall 12 which is connected to an end wall 13 of the superstructure 3 at flanges 14 and 15 which are connected by conventional means such as, for example, spot welding. An angle member 17 is provided on a horizontally extending section 16 of the end wall 13 and adjacent the spot welded flange 15 to form a U-shaped channel member serving for the accommodation of sealing element 18.

The rear space 11 is closed by hood 19 pivotably connected to hinges (not shown) provided at the superstructure 3 of the passenger car 1. The hood 19 is disposed in an opening of the superstructure 3 and comprises an outer part 20 and an inner part 21. The inner part 21 extends along the marginal zone of the outer part 20 and is held in position at its rim sections by flanges 22 of the outer part 20.

In the interior of the rear space 11, a solid roof attachment 23 is accommodated. The roof attachment is produced from a suitable plastic and serves for covering the passenger space of the passenger car between the windshield frame and the roll yoke or header. The roof attachment 23 is held in the rear space 11 in devices 24, 25 provided on the partitions 10 and 12 of the superstructure 3 of the passenger car 1. Device 24 is represented, in the embodiment, by a cast plastic part and has a U-shaped receiving section 26, into which an edge 27 of the roof attachment 23 extends. The mounting of the device 24 to the partition 10 is effected by conventional means such as, for example, screws or other suitable means.

The device 25 provided on the partition 12 consists of an elastic section 28 and thus is manufactured of a material having resilient characteristics. In device 25, a receiving section 29 is provided which surrounds a rim 30 of the roof attachment 23 in a tonglike or clamplike manner. Furthermore, device 25 is provided with an extension or widened portion 31 which functions as a cam 32. The cam 32 rests on a chamfer 33 of the inner part 21 of hood 19 when the hood is closed. Device 25 is mounted in a bearing section 34 having a U-shape, which is attached to the partition 12 of the superstructure 3 by conventional means such as, for example, screws. For this purpose, the bearing section is provided with apertures 35, 35', and device 25 has a bushing 36 fixedly connected with this elastic component. A shank of a screw 37 extends through the apertures 35 of the bearing section 34 and the bushing 36 of the device 25, and the screw 37 is threadedly connected to nut 38. This ensures a satisfactory and simple retention of device 25.

In order to release the roof attachment 23, the extension 31 of the device 25, after hood 19 has been opened, is manually actuated toward end wall 13 of the passenger car 1 and placed in a position which is indicated in the drawing in dot-dash lines. Thereby, the receiving section 29 is opened and the rim 30 of the roof attachment 23 is released. In order to counteract any undesired release of the roof attachment 23 from its mounting in the rear space 11, the cam 32 of the device 25 cooperates with the chamfer 33 of the inner part 21 of hood 19 to retain the receiving section 29 in position securely and under tension.

While I have shown and described only one embodiment in accordance with the present invention, it is clear that the same is susceptible to numerous changes and modifications as known to a person skilled in the art, and I, therefore, do not wish to be limited to the details herein shown and described but intend to cover all such changes and modifications as encompassed by the scope of the invention.

I claim:

1. A passenger car having a superstructure and including a detachable unitary form-rigid roof member and storage means for storing said roof member; said storage means comprising a space provided within the contours of the superstructure of the car, hood means operatively connected to the superstructure for selectively covering said space, and mounting means including bearing sections for firmly engaging edge portions of said roof member provided at relatively fixed spaced walls of the superstructure for mounting the roof member within said space.

2. A passenger car according to claim 1, wherein said bearing sections include groove means into which said edge portion are inserted.

3. A passenger car according to claim 1 wherein the mounting means provided at one wall include fixed groove means constructed of relatively nonelastic material, and wherein the mounting means provided at another wall includes movable groove means of relatively elastic material, said respective groove means being arranged to engage opposite edge portions of said roof member 4. A passenger car according to claim 1, wherein said space is located adjacent an end portion of said car, and wherein said walls include two substantially parallel walls spaced from one another and extending substantially perpendicularly to the longitudinal axis of said car.

5. A passenger car according to claim 4, wherein said end portion is at the rear of the car behind a passenger space provided in the car.

6. A passenger car according to claim 4, wherein said end portion is at the front of the car in front of a passenger space provided in the car.

7. A passenger car according to claim 1, wherein the mounting means includes at least one elastic means having a bearing section for engaging one of said portions of said roof member.

8. A passenger car according to claim 7, wherein said at least one elastic means is selectively movable into engagement with said edge portion, and wherein handle means are provided on said elastic means for manually moving said elastic means into and out of engagement with said edge portion.

9. A passenger car according to claim 7, wherein said at least one elastic means includes a cam means, and wherein said hood means includes abutment means arranged to engage said cam means when said hood means is closed for holding said elastic means in a locked position with respect to said roof member.

10. A passenger car according to claim 9, wherein said space is located adjacent an end portion of said car, and wherein said walls include two substantially parallel walls spaced from one another and extending substantially perpendicularly to the longitudinal axis of said car.

11. A passenger car according to claim 10, wherein said end portion is at the rear of the car behind a passenger space provided in the car.

12. A passenger car according to claim 10, wherein said end portion is at the front of a passenger space provided in the car.

13. A passenger car according to claim 10, wherein said hood means is hingedly connected to the car superstructure for pivotal movement about an axis adjacent to and extending parallel to the upper edge of the wall furthermost from the extreme end of the vehicle.

14. A passenger car according to claim 13, wherein said abutment means is located adjacent the edge of said hood means located opposite of the edge hingedly connected to the car superstructure.

* * * * *